July 15, 1969   D. L. FULLER   3,455,226
SHUTTER-APERTURE MECHANISM FOR A CAMERA
Filed July 26, 1967                                                2 Sheets-Sheet 1

INVENTOR.
DAVID L. FULLER
BY Newton, Hopkins,
Jones & Ormsby
ATTORNEYS

July 15, 1969  D. L. FULLER  3,455,226
SHUTTER-APERTURE MECHANISM FOR A CAMERA
Filed July 26, 1967  2 Sheets-Sheet 2

INVENTOR.
DAVID L. FULLER
BY Newton, Hopkins,
Jones & Ormsby
ATTORNEYS

United States Patent Office 3,455,226
Patented July 15, 1969

3,455,226
SHUTTER-APERTURE MECHANISM FOR A CAMERA
David L. Fuller, 3057 Pharr Court NW., Atlanta, Ga. 30305
Continuation-in-part of application Ser. No. 540,246, Apr. 5, 1966. This application July 26, 1967, Ser. No. 656,217
Int. Cl. G03b 9/42
U.S. Cl. 95—56                                    7 Claims

ABSTRACT OF THE DISCLOSURE

The present invention relates to photographic cameras and a shutter-aperture mechanism for use therein with lens systems of the same general type as disclosed and claimed in my United States Patent 3,251,266 that issued May 17, 1966. The present shutter-aperture mechanism includes a pair of blades normally arranged in a closed position for preventing the transmission of light, each of which is adapted to travel in opposite directions at a selected rate to allow the transmission therebetween, and means for regulating the distance of travel of said blades from said closed position.

CROSS-REFERENCE TO RELATED APPLICATIONS

The present application is a continuation-in-part of the shutter-aperture combination disclosed and claimed in my co-pending United States patent application Ser. No. 540,246 filed Apr. 5, 1966, now Patent No. 3,361,512, for a Wide Angle Objective Having Non-Spherical Surfaces.

SUMMARY OF THE INVENTION

The present invention encompasses a unique shutter-aperture mechanism for a camera and utilizes a pair of arcuate blades that are positioned concentric about an axis and adapted to reciprocate at a selected rate of travel from and to a closed position centered on the picture taking axis of the camera.

Within the camera body there is mounted an inertia wheel that is adapted to pivot about an axis that is parallel to the optical axis of the camera. The inertia wheel is operatively connected to each of the arcuate blades so that rotation in the first direction causes the blades to open and rotation in the second direction causes them to return to their closed latch position.

Operatively connected to the inertia wheel is a shuttle bar that is designed to reciprocate in a first and second direction. The shuttle bar is normally biased to move in the first direction and is releasably latched at an inoperative position with the blades being closed.

Also mounted in the camera is an activating mechanism for selectively releasing the latch from engagement with the shuttle bar for allowing the rotation of the inertia wheel to open the arcuate blades.

Further mounted in the camera body is a means in the form of a trip hammer for imparting reverse motion to the shuttle bar to return the blades to their closed latch position.

Associated with the shuttle bar is a regulating means for selecting the time interval at which the reverse motion is imparted after the shuttle bar has been set in motion. The concentric blades are so shaped that, when open, they define an aperture wherein the dimension at the center is less than at the end portions thereof.

OBJECTS OF THE INVENTION

It is an object of this invention to provide a between-the-lens shutter-aperture combination adapted for use with toroidal concentric optical systems wherein the blades of said shutter-aperture are themselves concentrically arranged about the common axis of revolution of the optical system. It will be recognized in the light of this disclosure that a concentric shutter-aperture combination is suited for use with a toroidal concentric optical system, thereby combining the secondary aperture with the shutter mechanism.

Another object of the invention is to provide a shutter-aperture combination whereby the shutter blades reciprocate from and to a closed position which is centered on the picture taking axis of the lens system, thereby providing a concentric aligned aperture through which light may pass into the film cavity.

Still another object of the invention is to define a shutter-aperture combination to selectively admit light wherein the end portions of said aperture are substantially wider than the center portion thereof, thereby permitting the admission of more light at the extremities of the aperture during exposure and assuring an even exposure across the film.

Another object of the invention is to impart a selective rate of travel to the shutter blades and by suitable means regulate the distance each blade travels thereby combining the functions of shutter speed and aperture control into one set of blades. This greatly simplifies the mechanical design, and, further, improves the accuracy and reliability of such a unit.

Still another object of the invention is to provide a mechanism which can be simply regulated by a photoelectric exposure control means thereby giving the camera operator a desired degree of automatic exposure control.

Other objects of the invention are apparent from the following description, references being made to the accompanying drawings in which:

DESCRIPTION OF ILLUSTRATIVE EMBODIMENT

Figure 1:
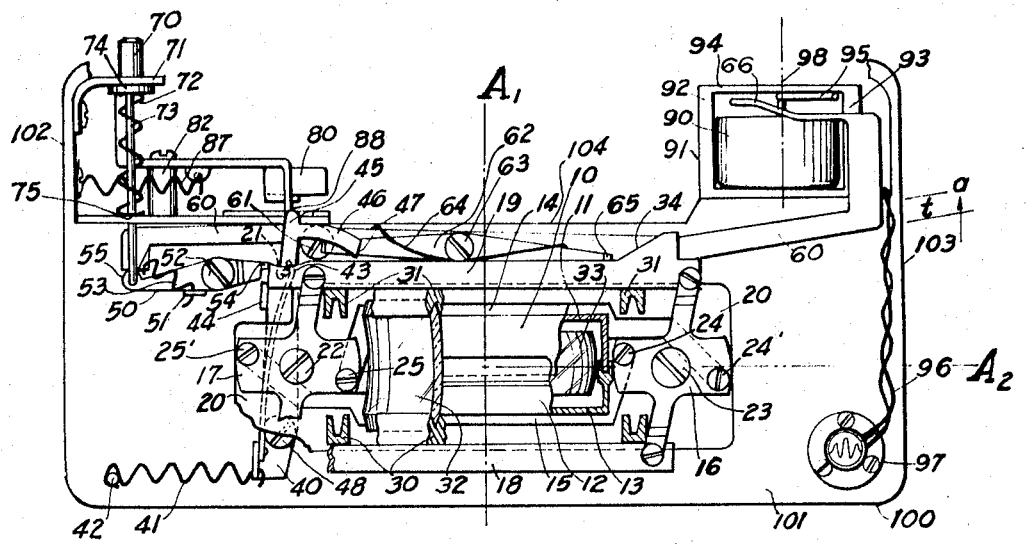
FIGURE 1 is a front elevation of the shutter-aperture combination mounted on a camera body with the mechanism at rest in the uncocked position and showing some components in partial section.

Referring more particularly to FIGURE 1, numeral 10 generally denotes the upper shutter blade which is formed as an arcuate thin metal sheet concentrically arranged between front toric lenses 32 and 33 and lens mounting members 30 and 31 about the vertical axis of concentricity $A_1$ of the optical system. Shutter blade 10 is bounded along its upper edge by metal end plate 11, perpendicular to lens board 20, thus forming an open "pillbox" which has been cut along its diameter. The rear edge of end plate 11 terminates a short distance parallel to lens board 20, and is rigidly fastened to transverse connecting member 14 which extends to either side of axis $A_1$ parallel to the plane $A_1$–$A_2$.

In a symmetrically opposed manner lower shutter blade 12 and endplate 13 form an open semi-"pillbox," concentrically arranged about axis $A_1$ and fastened to transverse connecting member 15. The extreme end portion of transverse connecting members 14 and 15 are pin-connected respectively at 24 and 24′ and 25 and 25′ and free to pivot on inertia wheels 16 and 17 which are symmetrically arranged about axis $A_1$ adjacent shutter blades 10 and 12, their hubs 22 and 23 being positioned on lateral axis $A_2$. Pin connecting the upper and lower extremities of inertial wheels 16 and 17 are transverse shuttle bars 18 and 19 thus completing a closed linkage system.

Figure 5:
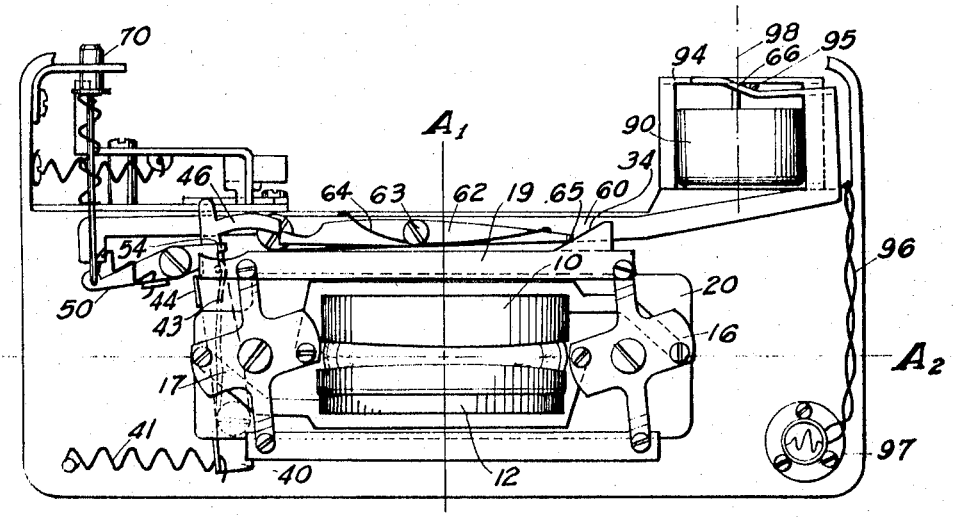
FIGURE 5 is a front elevational view showing the positioning of the various members with the blades in their open position.

In the chosen arrangement the upper edge of shutter blade 12 is extended slightly above transverse axis $A_2$ and is grooved so as to receive upper shutter blade 10 which is similarly extended below axis $A_2$, thereby forming a tongue and groove configuration which assures a "light tight" seal when the shutter is in the rest or closed position. It will be understood that the positioning of shutter blades 10 and 12 is selected to coincide with the position of the secondary aperture of forward aperture of a toric concentric lens system as disclosed in my U.S. Patent 3,251,266. Therefore, shutter blades 10 and 12 comprise a combination shutter and secondary aperture whereby, as seen in FIGURE 5, the mating edges of the shutter blades are shaped to a smooth curve so as to allow additional admission of light at the extremities of the aperture that is so formed during operation of the shutter.

In operation then, an arcuate reciprocating displacement of inertia wheels 16 and 17, beginning in a counter-clockwise direction results in a rear vertical reciprocating motion being imparted to the shutter blades 10 and 12, from and to a closed or rest position that is centered on the optical picture taking axis $A_3$ of the camera, and a cooperating horizontal reciprocating motion of shuttle bars 18 and 19.

Shutter actuation mechanism

With reference to FIGURE 1, camera body 100 is formed by front wall 101, which lies in a plane parallel to lens board 20 and is displaced rearwardly therefrom, and side members 102 and 103 formed normally to said front wall 101 and extending rearwardly therefrom, and upper interior wall 104 that is perpendicular to side walls 102 and 103 and front wall 101 and terminating in the same plane as side walls 102 and 103.

Figure 2:
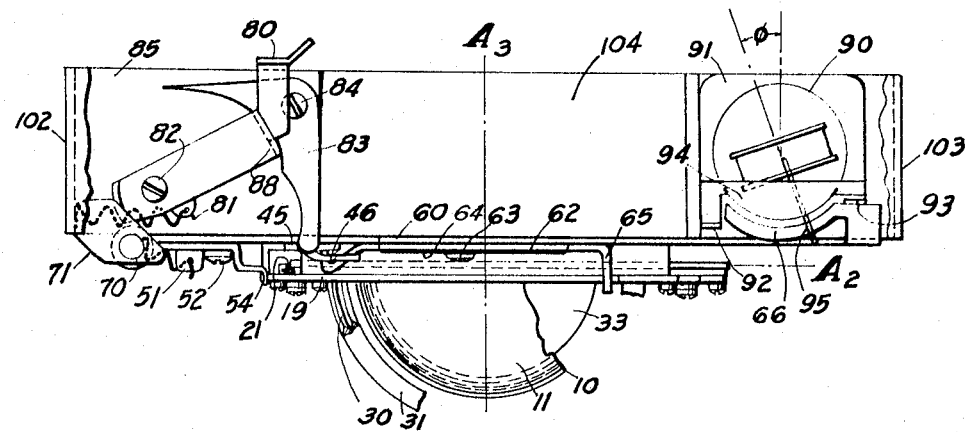
FIGURE 2 is a plan view of said shutter-aperture combination and the camera body with the top of the camera body cut-away to reveal the interior details thereof.

Shutter release bracket 71 is bolted to side member 102 and extends in and forward of its attachment point, whereby an aperture is incorporated therein so as to receive shutter release button 70, which is free to reciprocate vertically. The lower edge of shutter release button 70 is machined to form a shoulder 74 so as to act as a stop, and shutter push rod 73 is fastened to said release button 70 and extends downwardly through a clearance aperture 75 in mounting plate 85 and terminates at shutter release latch 50. Shutter return spring 72 is coiled about shutter push rod 73 in the space above mounting plate 85 and is in compression, thereby exerting an upward returning force to shutter release button 70 at all times. As best seen in FIGURE 1, shutter release latch 50 is pivotal about hub 52, said hub mounted on front wall 101 on a transverse line normal to shutter push rod 73 whereby the lower extremity of push rod 73 is pivotally linked to latch 50. The inward extension of latch 50, as seen in FIGURE 2, namely tab 54, extends forward of and normal to front wall 101, such that it can block the lateral movement of shuttle bar 19. In the firing sequence then, a downward depression of shutter release button 70 causes an arcuate upward displacement of tab 54, thereby releasing shuttle bar 19.

Shutter driving means

In the present invention the reciprocal motion imparted to the shutter blades 10 and 12 is best achieved by creating two opposed lateral driving forces, said forces being applied in the proper sequence to shuttle bar 19. These forces may be adequately supplied by leaf spring 43 and coil spring bias 41, both springs being attached to synchronizing lever 40 which is free to pivot about hub 48 also mounted to front wall 101 behind lens board 20. Projecting outwardly from synchronizing lever 40 is return tab 44, its upper inside edge free to slide on the end of shuttle bar 19 during its travel. The lower portion of leaf spring 43 is fastened to the lower extremity of synchronizing lever 40, said spring extending in an upward direction, its upper end free and in sliding contact with the inner side of boss 21, which projects a short distance into the space between shuttle bar 19 and front wall 101, whereby leaf spring 43 exerts an outward transverse pressure against boss 21 at all times.

Coil spring bias 41 is hooked about the lower extremity of synchronizing lever 40 and its left end to front wall 101 at point 42, thereby exerting a clockwise torque on level 40 which normally keeps the shutter closed in the rest position.

Shutter timing and aperture control means

For the purpose of general orientation, reference is once again made to FIGURE 1, which illustrates a galvanic meter movement 90 mounted on bracket 91 which in turn is mounted on upper interior wall 104, said meter having a vertical axis of rotation and attached thereto is swinging arm member 95, which extends forwardly to a short distance beyond the meter case and operates in a horizontal plane. Meter bracket 91 has upwardly extending front members 92 and 93 which support back-up plate 94, said plate formed in a horizontal plane whereby its forward edge is concentric about axis 98. Indexing arm 95 is then free to swing beneath backup plate 94 with a small gap therebetween.

In the chosen arrangement, transverse timing member 60 is formed in a plane parallel to front wall 101 and is free to pivot about hub 61 attached thereto. The left extremity of timing member 60 is shaped to follow upper semi-circular cam 55, an extension of shutter release latch 50, under the action of spring bias 53 connecting said members.

The right extremity of timing member 60 terminates at a point adjacent the right edge of front wall 101, thence continues upwardly to connect with aperture control ramp 66. The inner edge of aperture control ramp 66 is shaped to clear the front edge of backup plate 94 when timing member 60 is given a counter-clockwise displacement.

In the proper sequence of events then, indexing arm 95 will deflect to an angle $\phi$, commensurate with the amount of current flowing through lead wires 96 via the light sensitive photo-electric pickup cell 97, whereby activation of the shutter release button 70 causes ramp 66 to move vertically until it contacts indexing arm 95 thereby setting the timing member 60 at the proper angle $\alpha$ for the lighting conditions present.

In addition to timing member 60, disengagement latch 62 is shown mounted thereon, said latch being free to pivot about its hub 63 positioned near axis $A_1$. Latch member 62 is biased by leaf spring 64 whereby a clockwise torque is impressed on it. The right portion of latch 62, tab 65 projects forwardly out of the plane of front wall 101, as best seen in FIGURE 2, and crosses over shuttle bar 19, whereby the section of shuttle bar 19 between tab 65 and the extreme right end thereof has substantially the form of ramp 34.

The extreme left section of latch 62 is joggled out and around to clear hub 61 and ends at a point near the center of said hub. The upper portion of synchronizing lever 40 has arcuate segment 46 attached thereto, said segment in flush proximity to hub 61, whereby during the cocking motion segment 46 is drawn along an arcuate path counter-clockwise about hub 48 until the extreme right end passes the mid-point of hub 61 thereby permitting the left extension of latch 62 to pass in front of and lock synchronizing lever 40.

Shutter cocking means

Clearly evident in FIGURE 2 is mounting plate 85, positioned on upper interior wall 104, and extending to the front and rear edge thereof, adjacent side wall 102. Fastened to said plate is spacing hub 82 about which swings film advancing lever 80, said lever projecting rearwardly beyond the rear edge of upper interior wall 104 to form a thumb hold, whereby advance lever 80 may be manually stroked in a reciprocating manner against the returning torque of spring bias 81. Projecting downwardly from the film advance lever is cam follower 80, its lower surface just clearing mounting plate 85 and its outer surface resting against the inner cammed surface of cocking lever 83, which is free to pivot about hub 84 also attached to mounting plate 85.

Figure 3:
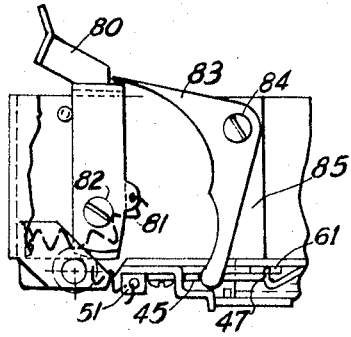
FIGURE 3 is a cut-away view of the details depicted in FIGURE 2, during the shutter cocking phase.

As seen in FIGURE 2, the forward most extremity of cocking lever 85 protrudes beyond front wall 101 and cooperates with the inner surface of tab 45, a vertical extension of synchronizing lever 40. The inner cammed surface of cocking lever 83 is so designed that an arcuate displacement of advance lever 80 in the counter-clockwise direction causes a rotational displacement of cocking lever 83 in the clockwise direction thereby moving tab 45 outwardly far enough to allow segment 46 to clear and thereby be locked in position by latch 62. This condition is best illustrated in FIGURE 3. At this point the shutter is cocked and the film advance lever 80 and cocking lever 83 return to the rest position.

It should be noted that it is possible to prevent the operator from accidentally or purposely activating the shutter during cocking, which would jam the mechanism, by simply extending the end of film advance lever 80 adjacent push rod 73 upwardly at a right angle such that the upper surface of the extension so formed will clear under by a small amount the shoulder 74 on shutter release button 70. It is therefore impossible to depress release button 70 far enough to activate the mechanism as its travel is blocked during the cocking stroke and is only free to clear at the rest position.

Operation of the shutter

Figure 4:
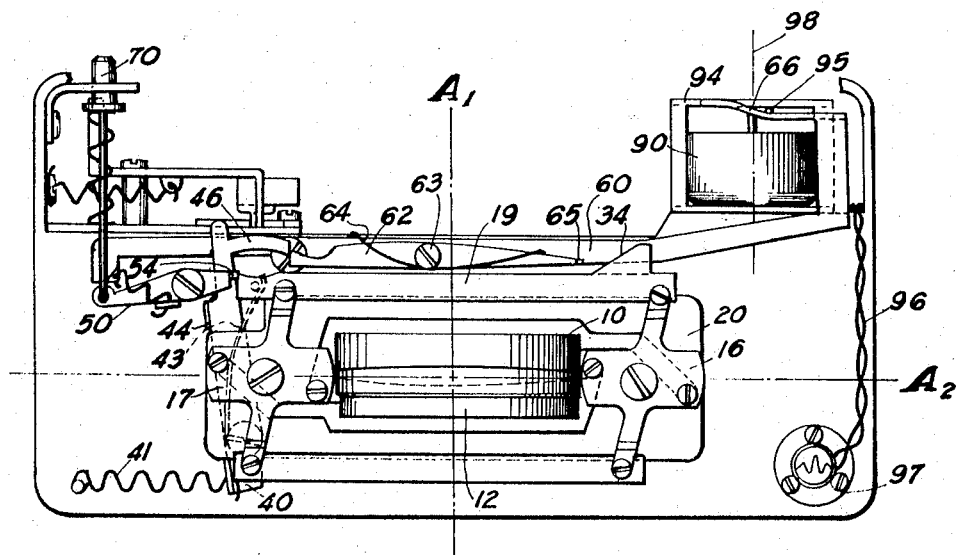
FIGURE 4 is a front elevational view showing the positioning of various members at the closed position immediately preceding firing of the shutter.

At the commencement of the firing sequence shutter release button 70 is depressed, thereby permitting timing member 60 to rotate and index as seen in FIGURE 4, thence shutter release latch 50 continues to rotate in counter-clockwise direction until such time as shutter release tab 54 disengages shuttle bar 19. At this point leaf spring 43 energizes shuttle bar 19 and it accelerates rapidly to the left, thereby opening the shutter. This event is illustrated in FIGURE 5. Some short period later, ramp 34 makes contact with latch tab 65 whereby said tab is raised along an arcuate vertical path about hub 63 thereby thrusting the left end downwardly far enough to disengage synchronizing lever 40. At this instant, synchronizing lever 40 accelerates in the clockwise direction by its spring bias 41, whereupon return tab 44 contacts shuttle bar 19 returning it and the shutter blades to the rest position, FIGURE 1.

It will be understood by those skilled in the art that timing member 60 acts as an aperture control by reason of the infinite number of heights at which initial lateral contact can be made by tab 65 with ramp 34. Accordingly, if a deflection of indexing arm 95 is such that timing member 60 can deflect the maximum angle $\alpha = t$, as shown in FIGURE 1, the eventual engagement of tab 65 with ramp 34 is delayed until most of said ramp has passed beneath tab 65, thereby permitting a maximum opening of the shutter blades. If, on the other hand, a small opening of the blades is desirable, the displacement of the timing lever would necessarily be negligible thereby activating the closing sequence shortly after the blades had begun to open. Clearly then, the relative timing of the shutter open and shutter close phases of operation is controlled by the slope of ramp 34 and the shape of ramp 66 as well as the index arm deflection angle $\phi$ which is regulated by the light intensity of the scene that falls on the photoelectric pickup cell, and the consequent current flow to the galvanometer 90.

It should be noted that the rate at which opening and closing occur is controlled by the masses of shuttle bars 18 and 19, and of inertia wheels 16 and 17 in combination with the two opposed driving forces imparted by drive springs 41 and 43 to shuttle bar 19. Moreover, it is usually necessary to balance the mechanism in-as-much as an uneven distribution of masses will cause a resulting force during the firing cycle and result in an undesirable jarring of the camera itself.

In order to assure the most constant and repeatable driving rate it is desirable to select drive springs 41 and 43 such that they have relatively low spring constants and arrange them to produce relatively large forces so that a deflection of the springs will give as small a force change as possible during operation. An added benefit is gained by this arrangement whereby frictional forces assume a negligible portion of the total forces on the system further assuring repeatable operation.

In practice it has been found that the shutter function (amount of light passed through the aperture versus time) is approximately parabolic in wave form, and can easily attain a time range of $\frac{1}{25}$ sec. to over $\frac{1}{1000}$ sec. by simple manipulation of the masses involved and calibration of the springs that drive the shutter.

Having described one specific embodiment of the invention, it is desired that it be understood that this form is selected to facilitate the disclosure of the inveniton rather than to limit the number of forms which it may assume; and, it is to be further understood that various modifications, adaptations, and alterations may be applied to the specific form shown to meet the requirements of practice, without in any way departing from the spirit or scope of the present invention.

I claim:

1. A shutter-aperture mechanism for a camera comprising a pair of arcuate blades positioned concentric about an axis and adapted to reciprocate at a selected rate of travel from and to a closed position centered on the picture taking axis of said camera, said blades when open forming a configuration by the edges thereof nearer the picture taking axis that defines a concentric aperture wherein the center of said aperture at any open position is substantially narrower than the end portions thereof, and means for regulating the distance of travel of said blades from said closed position.

2. A shutter-aperture mechanism as defined in claim 1 and further characterized by a means for cocking said shutter.

3. A shutter-aperture mechanism as defined in claim 2 and further characterized by a means for preventing the activation of the shutter during the cocking thereof.

4. A shutter-aperture mechanism as defined in claim 3 and further characterized by a means for activating said shutter.

5. A shutter-aperture mechanism as defined in claim 1 and further characterized in that said regulating means includes a photo-electric exposure control.

6. A shutter-aperture mechanism as defined in claim 1 and further characterized in that said blades reciprocate parallel to said axis.

7. A shutter-aperture mechanism for a camera comprising:
(a) a pair of arcuate blades positioned concentrically about an axis and adapted to reciprocate at a selective rate of travel from and to a closed position centered on the picture taking axis of said camera;
(b) an inertia wheel pivotally mounted on said camera and operatively connected to each of said arcuate blades;

(c) a shuttle bar operatively connected to said inertia wheel;
(d) biasing means operatively connected to said shuttle bar for normally urging said shuttle bar in a first direction to rotate said inertia wheel;
(e) latch means for selectively locking said shuttle bar in an inoperative position;
(f) means for selectively releasing said latch means to cause said blades to open;
(g) means for imparting a reverse motion to said shuttle bar to return said blades to their closed latched position; and
(h) means for regulating the interval at which said reverse motion is imparted to said shuttle bar after it is set in motion for regulating the distance of travel of said blades;

said blades, when open, defining an aperture wherein the center of said aperture is substantially narrower than the end portions thereof.

References Cited
UNITED STATES PATENTS

| | | | |
|---|---|---|---|
| 369,997 | 9/1887 | Simon | 95—56 |
| 2,076,481 | 4/1937 | Riszdorfer. | |
| 3,251,266 | 5/1966 | Fuller | 95—17 X |

JOHN M. HORAN, Primary Examiner

U.S. Cl. X.R.

95—15, 16, 17, 62